United States Patent [19]

Becker

[11] Patent Number: 5,093,988
[45] Date of Patent: Mar. 10, 1992

[54] METHOD FOR ATTACHING A FLEXIBLE CONNECTOR

[75] Inventor: James A. Becker, Grafton, Wis.

[73] Assignee: Kohler Co., Kohler, Wis.

[21] Appl. No.: 645,362

[22] Filed: Jan. 24, 1991

[51] Int. Cl.$^5$ ............................................. H01R 43/02
[52] U.S. Cl. ................................... 29/860; 174/94 R;
   219/121.14; 219/121.64
[58] Field of Search .......................... 29/840, 843, 860;
   174/94.1; 219/121.13, 121.14, 121.63, 121.64

[56] References Cited

U.S. PATENT DOCUMENTS

| | | | |
|---|---|---|---|
| 1,762,604 | 6/1930 | Ainsworth . | |
| 2,821,594 | 1/1958 | Latour | 200/87 |
| 3,132,239 | 5/1964 | Schollhammer | 219/121.14 |
| 3,433,923 | 3/1969 | McNabb | 219/121.13 |
| 3,562,888 | 2/1971 | Settle | 219/121.14 |
| 3,936,782 | 2/1976 | Maokler et al. | 335/161 |
| 4,511,774 | 4/1985 | Forsell | 200/147 R |
| 4,642,446 | 2/1987 | Pennington | 219/121.64 |
| 4,804,933 | 2/1989 | Becker et al. | 335/186 |
| 4,849,590 | 7/1989 | Becker et al. | 200/147 R |
| 4,940,878 | 7/1990 | McKee et al. | 29/610.1 |

FOREIGN PATENT DOCUMENTS

| | | | |
|---|---|---|---|
| 10610 | 5/1980 | European Pat. Off. | 219/121.64 |
| 138074 | 5/1989 | Japan | 219/121.14 |

OTHER PUBLICATIONS

Brochure on the Automatic Switch Company remote control contactor model ESCO917, copyrighted 1984.

*Primary Examiner*—P. W. Echols
*Attorney, Agent, or Firm*—Quarles & Brady

[57] ABSTRACT

A flexible electrical connector is attached to a movable contact finger and a stationary termianl by placing the components in a work chamber and positioning a first end of the flexible connector against an attachment surface of the contact finger, preferably in a perpendicular orientation. After evacuating the work chamber, the output of an electron gun is directed toward a joint formed between the flexible connector and the contact finger. The electron beam forms a weld zone which fuses the the flexible connector with the contact finger without degrading the flexibility of the connector or the mechanical strength of the contact finger. A second end of the flexible connector is positioned against an attachment surface of the stationary terminal, such as in a parallel orientation, and attached in a similar manner.

19 Claims, 3 Drawing Sheets

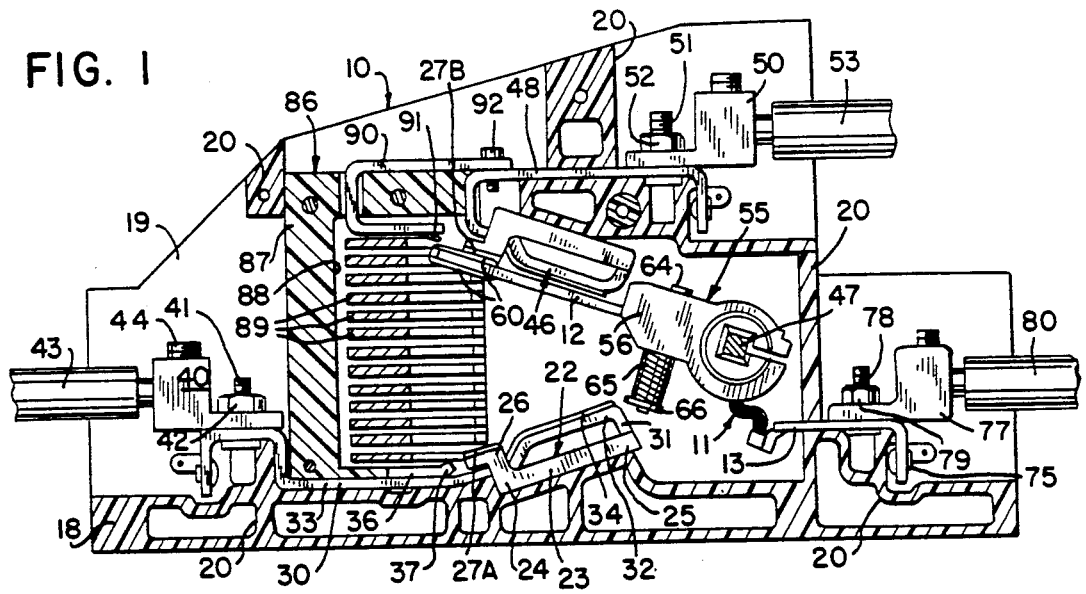
FIG. 1
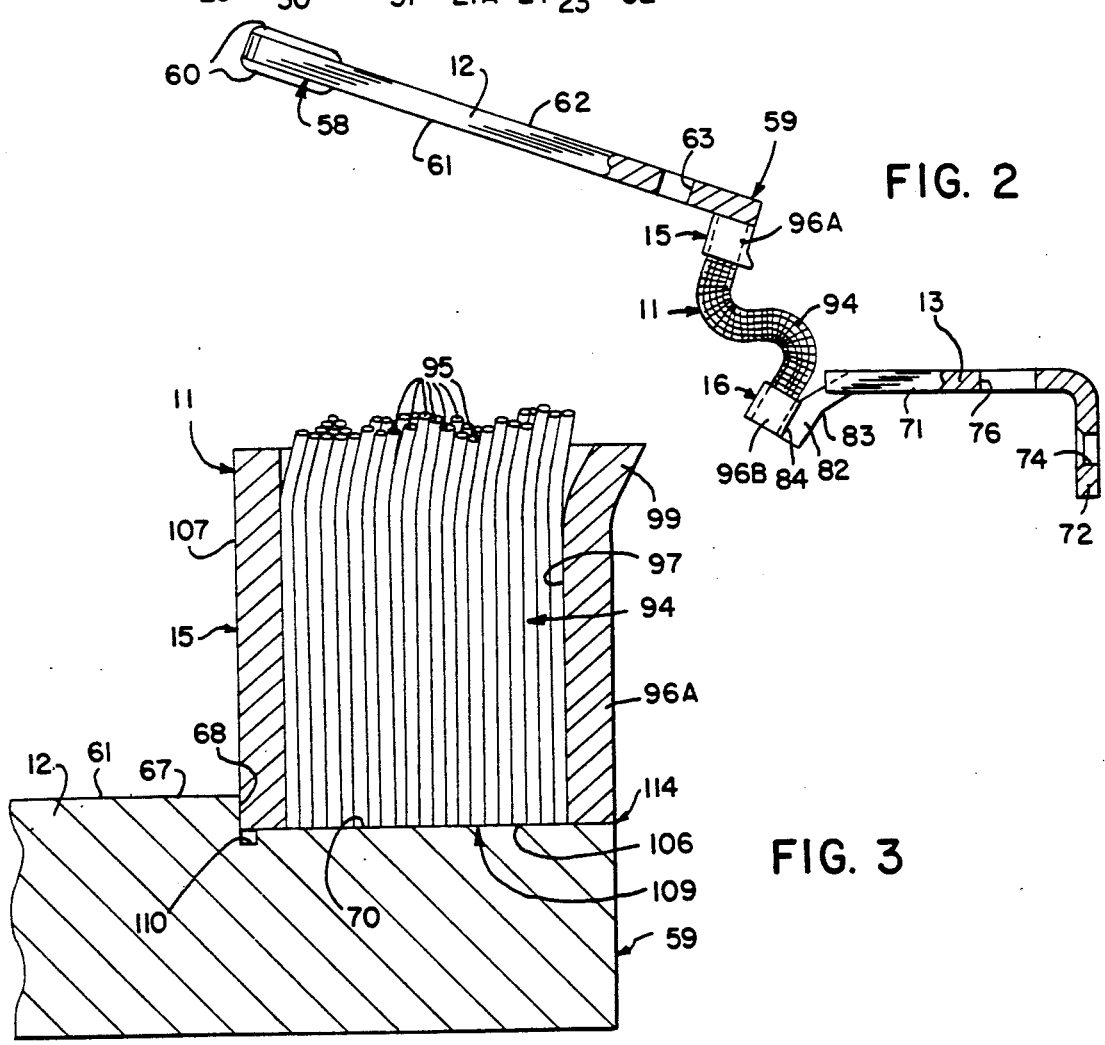
FIG. 2
FIG. 3

METHOD FOR ATTACHING A FLEXIBLE CONNECTOR

BACKGROUND OF THE INVENTION

The present invention relates to a method for attaching an electrical connector to a base material. More particularly, it pertains to a method for attaching a flexible electrical connector to a movable contact finger and a stationary terminal without degrading the flexibility of the connector or the mechanical strength of the contact finger and the stationary terminal.

Electrical contactors commonly have flexible, electrically-conductive connectors that operatively connect a movable contact finger and a stationary terminal. U.S. Pat. Nos. 4,804,933 and 4,849,590, which are both assigned to Brown Industrial Gas, Inc., disclose switch modules that incorporate flexible connectors. Prior methods for attaching the flexible connector to the contact finger and stationary terminal have included brazing, resistance brazing, resistance welding and plasma arc welding. All of these attachment methods generate a relatively large heat affected zone surrounding the weld zone that disadvantageously anneals the connector. Annealing softens a portion of the connector which leads to erratic flexing and buckling, and eventual breaking, of the connector. The heat also anneals the contact finger and the terminal which lessens the mechanical strength of these components. A further disadvantage with such methods is that the relatively large heat affected zone changes the resistance of the components. Other methods, such as ultrasonic welding, are limited because large connectors cannot be welded due to transducer power limitations.

A further drawback associated with prior methods relates to the arrangement of the flexible connector relative to the base materials, such as the movable contact finger and the stationary terminal. The flexible connector is positioned generally parallel to each base material and welded in place. This necessitates that the contact finger and the stationary terminal be positioned a substantial distance apart in order for the connector not to flex dramatically or flex adjacent the connections.

SUMMARY OF THE INVENTION

The present invention is an improved method for attaching a flexible, electrically-conductive connector between a movable contact finger and a stationary terminal. The method includes positioning a first end of the flexible electrical connector in contact with an attachment surface formed on the movable contact finger, and in a preferred embodiment, positioning a first end face flush against the attachment surface, such that the contact defines a first joint. An opposite second end of the flexible connector is positioned in contact with an attachment surface formed on the stationary terminal, such that the contact defines a second joint. An electron beam is directed toward the first joint, to form a first weld zone that fuses the first end face of the flexible connector to the attachment surface of the contact finger. Similarly, an electron beam is directed toward the second joint, to form a second weld zone that fuses the second end of the flexible connector to the attachment surface of the stationary terminal.

A general object of the invention is to attach the flexible connector to the movable contact finger and the stationary terminal in a manner that minimizes annealing of the connector and the base materials. The flexible connector is fusion welded to the base materials by bombarding the first and second joints with focused beams of high-velocity electrons. The kinetic energy of the electrons changes to heat upon impact with the flexible connector and the base materials. The electron beam contains a larger amount of energy in a more concentrated area than prior methods, and thus can be advanced faster. As a result of these conditions, the heat affected zone is relatively small compared to that created by prior methods. Consequently, only a small portion of the connector and base materials surrounding the weld zone is annealed. The present method is useful to weld almost any material that can be arc welded, and the resulting weld quality in most metals is equal or superior to that of the best gas tungsten arc welds. Additionally, the method of attachment may be used on large connectors without encountering the power limitations associated with ultrasonic welding.

Another object of the invention is to attach the flexible connector in a manner that minimizes the distance between the base materials without causing the connector to bend dramatically or bend adjacent the connections. The first end face of the flexible connector is positioned flush against the attachment surface of the movable contact finger, thus causing the first end to be orientated perpendicular to its attachment surface. Meanwhile, the second end can be oriented parallel to the attachment surface of the stationary terminal. By mounting the flexible connector in this manner, the amount of space between the movable contact finger and the stationary terminal can be reduced. Also, this arrangement is useful to prevent the flexible connector from bending adjacent the contact finger or the stationary terminal.

The foregoing and other objects and advantages of the present invention will appear from the following description. In the description, reference is made to the accompanying drawings which illustrate preferred embodiments of the invention. Such embodiments do not represent the full scope of the invention. Reference should therefore be made to the claims herein for interpreting the full scope of the invention.

BRIEF DESCRIPTION OF THE DRAWINGS

FIG. 1 is a cross-sectional view of a switch module incorporating a flexible electrical connector that is secured using a method embodying the present invention;

FIG. 2 is an enlarged plan view of the flexible electrical connector shown in FIG. 1, the connector attached between a movable contact finger and a stationary terminal by a method in accordance with the present invention, with portions broken away and shown in section for the purposes of illustration;

FIG. 3 is an enlarged view in vertical section of a first end of the flexible electrical connector positioned adjacent the movable contact finger preparatory to being joined together;

DETAILED DESCRIPTION OF THE PREFERRED EMBODIMENTS

Figure 4:
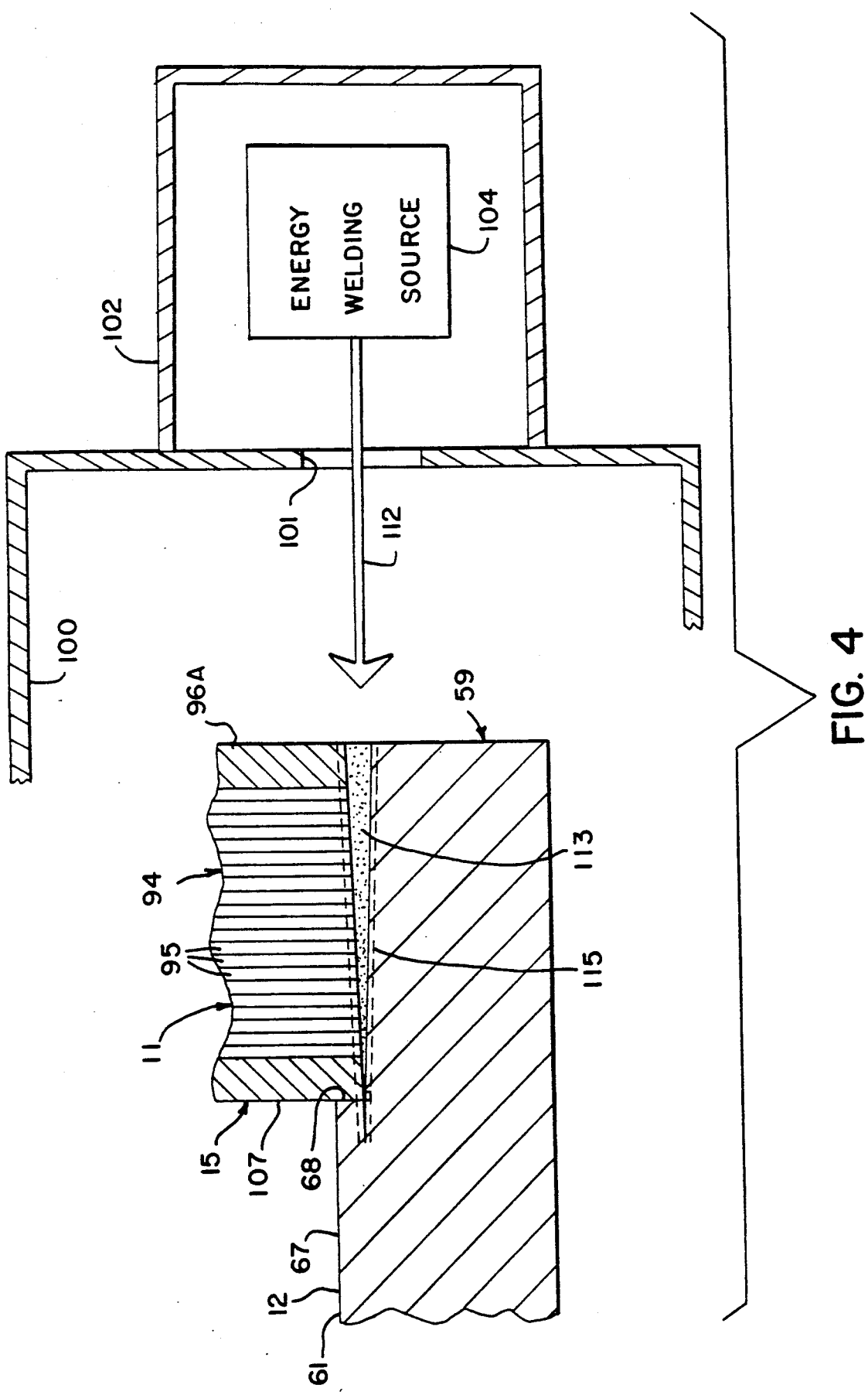
FIG. 4 is an enlarged view in vertical section showing the first end of the flexible electrical connector attached to the movable contact finger in accordance with the method of the present invention.

With reference to FIG. 1, a switch module for connecting an electric load to either a normal power source or an emergency power source is generally designated 10. The switch module 10 may be incorporated in an automatic transfer switch similar to that shown and described in U.S. Pat. No. 4,849,590, issued on July 18, 1989, and assigned to Brown Industrial Gas, Inc. The automatic transfer switch may incorporate one switch module 10 for each phase of a three phase electrical power system, although the exact number of switch modules 10 that are provided on the transfer switch is a matter of design choice depending upon the number of electrical lines being switched and the magnitude of the currents through each of the lines. The switch module 10 incorporates is a flexible, electrically-conductive connector 11 that electrically connects a movable contact finger 12 and a stationary terminal 13 (FIGS. 1 and 2). A first end 15 of the flexible connector 11 is attached to the contact finger 12 and an opposite second end 16 is attached to the stationary terminal 13 by a method of the present invention.

The switch module 10 includes a housing 18 that is formed in part by a first wall 19. The housing 18 is formed of a non-conductive material, such as plastic. A number of internal support ribs 20 extend from the first wall 19 and provide separation of the first wall from a parallel second wall that does not appear in the sectional view of FIG. 1. The support ribs 20 also provide support for the various internal components of the switch assembly to be described. In addition, grooves are provided on the interior surfaces of the first wall 19 and the second wall to receive the edges of the various internal components to further provide support.

Located within the switch 10 is a first fixed contact 22, which is formed of an electrically conductive material and has two spaced apart L-shaped members 23. One of the L-shaped members 23 is shown in FIG. 1 and the second is positioned behind the first in an identical orientation as the first. Each L-shaped member 23 has a short leg 24 and a long leg 25 with an end of each joined together. Extending between the distal ends of the two short legs 24 is a bridge member 26 so as to form a U-shaped contact section with each of the short legs 24. An electrical contact pad 27A is located on the outer surface of the bridge member 26.

The first contact 22 also includes an elongated conductor arm 30 having an end section 31 connected between the distal ends of each of the long legs 25. Extending at essentially a right angle from the end section 31 is a first section 32 of the conductor arm 30. This first section 32 is substantially coplanar with the bridge member 26. A second section 33 of the conductor arm 30 extends form the first section 32 bending under the bridge member 26 and between the two short legs 24. The second section 33 then continues to extend away from the bridge member 26. When the fixed contact 22 is positioned in the housing 18, a sheet of electrically non-conductive material 34 is placed between the bridge member 26 and the conductor arm 30 along the first section 32 of the conductor arm. The sheet 34 prevents the conductor arm 30 from contacting the bridge member 26.

An arc runner 36 of conductive material is attached to the second section 33 of the conductor arm 30 by a suitable mean such as riveting. The arc runner 36 has and end portion 37 that is bent away from the conductor arm 30 so as to extend toward the contact pad 27A and be closely spaced therefrom. As shown in FIG. 1, the end of the second conductor arm section 33 which is remote from the first section 32 is attached to a first cable clamp 40 by a threaded terminal stud 41 and nut 42. The first cable clamp 40 is a conventional device that includes an aperture into which the conductor of a first electrical cable 43 is fastened by a set screw 44. The first electrical cable 43 carries current from a first power source (not shown).

With continuing reference to FIG. 1, a second fixed contact 46 is also located within the switch module 10. The second fixed contact 46 is similar to the first contact 22 but is in an inverted position within the switch assembly with respect to the first fixed contact 22. The first and second fixed contacts 22 and 46 are positioned so that the surfaces of their contact pads 27A and 27B lie on different radii from the center of a switch shaft 47 extending through the module housing 18. The switch shaft 47 is rotated by a drive assembly (not shown) of the automatic transfer switch to switch the load to different power sources. A second section 48 of the conductor arm of the second fixed contact 46, however, is bent back looping over the top of the second fixed contact. The second section 48 is attached to a second cable clamp 50 by a threaded terminal stud 51 and an associated nut 52. The conductor of a second electrical cable 53 is fixedly held within the second cable clamp 50. The second electrical cable 53 carries current from a second power source (not shown).

Attached to the square switch shaft 47 is a movable contact assembly 55 that includes the movable, electrically conductive contact finger 12 attached to a shaft clamp 56. The shaft clamp 56 has a channel-like depression on its underside in which the movable contact finger 12 is held. The clamp 56 is fixedly coupled to the switch shaft 47. As noted previously, the switch shaft 47 extends through the switch module 10 from the drive assembly. The movable contact assembly 55 pivots within the housing 18 as the switch shaft 47 is rotated by the drive assembly. The contact assembly 55 pivots between the position shown in FIG. 1 and a second position where its contact finger 12 abuts the first fixed contact 22.

With additional reference to FIG. 2 showing the flexible connector 11, the movable contact finger 12 and the stationary terminal 13 isolated from the other components of the switch module 10, the contact finger 12 is formed of an electrically-conductive material such as copper and shaped generally in the form of a bar, having a contact end 58 and an opposite connection end 59. The contact end 58 has a contact pad 60 on each of its major surfaces, which will be referred to as the first and second surfaces 61 and 62 due to their geographical proximity to the first and second fixed contacts 22 and 46 when mounted in the switch module 10 as shown in FIG. 1. These contact pads 60 mate with the contact pads 27A and 27B on the fixed contacts 22 and 46, depending upon the position of the contact assembly 55. This mating completes an electric path between the movable contact finger 12 and the corresponding fixed contact 22 or 46.

Toward the connection end 59, the contact finger 12 is formed with an aperture 63. An elongated rivet 64 (FIG. 1) extends through the upper surface of the shaft clamp 56 and through the aperture 63. A compression spring 65 is located around the elongated rivet 64 between its lower end and the contact finger 12. A washer 66 holds the spring 65 on the elongated rivet 64. This attachment of the contact finger 12 to the shaft clamp 56 allows a pivoting movement between the contact finger and the shaft clamp when rotational force is exerted on the clamp by the shaft 47 after the contact finger 12 has engaged one of the fixed contacts 22 or 46.

Referring now to FIGS. 2 and 3, the first surface 61 of the contact finger 12 has a stepped contour adjacent the connection end 59. This stepped contour is caused by a vertically-extending shoulder 68 that is formed in the first surface 61. The shoulder 68 divides the first surface 61 into a main portion 67 which extends toward the contact end 60 and an attachment surface 70 adjacent the connection end 59. The width of the contact finger 12 is slightly less through the attachment surface 70 than through the main portion 67. The first end 15 of the flexible connector 11 is attached to the attachment surface 70 of the contact finger 12.

The second end 16 of the flexible connector 11 is attached to the stationary terminal 13 (see FIG. 2). The stationary terminal 13 is primarily L-shaped with a long member 71 and a short member 72 which meet to form an angle of approximately 90 degrees. The stationary terminal 13 is positioned in the housing 18 of the switch module 10 with the long and short members 71 and 72 positioned against the support ribs 20. The central portion of the short member 72 is formed with an aperture 74 that receives a fastener 75 to secure the stationary terminal 13 to the housing 18. The long member 71 is similarly formed with an aperture 76. A third cable clamp 77 is attached to the stationary terminal 13 by a threaded terminal stud 78 and an associated nut 79. The terminal stud 78 extends through the aperture 76 to connect the third cable clamp 77 to the stationary terminal 13. The conductor of a third electrical cable 80 is held within the cable clamp 77 and couples the switch module 10 to an electrical load (not shown).

The stationary terminal 13 also includes a projection 82 that extends at an angle away from the end of the long member 71 that is remote from the short member 72. The projection 82 is slightly bent at 83 and includes a generally flat attachment surface 84 after the bend 83. The attachment surface 84 is used for mounting the second end 16 of the flexible connector 11, as described below. The angle at which the projection 82 extends from the long member 71, and the angle of the bend 83, may be modified to provide the desired attitude for attaching the flexible connector 11.

With further reference to FIG. 1, the switch module 10 also includes an arc chute 86 having a housing 87 formed of a non-conductive material such as plastic. The chute housing 87 has an elongated U-shaped opening 88 on one of its edges within which opening the contact finger 12 moves when rotated by the shaft 47. The inner surfaces of the U-shaped opening are grooved to receive thirteen parallel U-shaped deion plates 89 formed of conductive and magnetic material, such as steel. The number of plates 89 is a matter of design choice depending upon the physical dimensions of the arc chute 86 and the voltage and current of the electricity being switched. The distance between the legs of the U-shaped deion plate 89 is selected to allow the movable contact finger 12 to pass therebetween as it rotates between the first and second fixed contacts 22 and 46.

A second conductive arc runner 90 extends into the chute housing 87 and has a tab 91 extending from it substantially coplanar with the contact pad 27B on the second fixed contact 46. The arc runner tab 91 is closely spaced from contact pad 27B and the movable contact finger 12 when the contact finger 12 is in contact with the second fixed contact 46. The second arc runner 90 is mechanically and electrically coupled to the second section 48 of the second fixed contact 46 by a bolt 92. This mechanical connection holds the arc chute 86 within the switch module 10, and allows visual inspection of the contact pads 27A, 27B and 60 when the bolt 92 is removed.

The drive assembly rotates the switch shaft 47 which moves the electrical contact finger 12 between the two fixed contacts 22 and 46. In the position illustrated in FIG. 1, the movable contact figer 12 is in electrical contact with the second fixed contact 46 so that the current applied to the switch module 10 via the second cable 53 is coupled through the flexible connector 11 to the third cable 80 going to the load. When the switch shaft 47 rotates the contact assembly 55 counter-clockwise from the position shown in FIG. 1, the contact finger 12 will strike the first fixed contact 22 and current supplied by the first cable 43 will be fed through the flexible connector 11 to the third cable 80. The arc chute 86 provides a quenching mechanism for any arc that may form between the contacts as they separate.

As shown in FIGS. 2 and 3, the flexible connector 11 is preferably formed of a flexible braid 94 of wire rope that is built of fine strands 95 of electrically conductive wire, such as copper wire. The opposite ends of the braid 94 are retained within first and second lugs 96A and 96B (FIG. 2), which are formed of an electrically-conductive material such as copper. Each lug 96A and 96B is tubular in shape with a central opening 97 extending between the two longitudinal ends of the lug. Each end of the braid 94 is positioned in a central opening 97 of a lug 96A or 96B, with the ends of the strands 95 terminating at one longitudinal end of the lug 96A or 96B. The lugs 96A and 96B are then crimped into a generally rectangular shape to retain the strands 95 of the braid 94. For switch modules 10 with greater electrical capacities, more than one braid 94 may be secured within the lugs 96A and 96B.

The longitudinal end of the first lug 96A that is positioned away from the ends of the strands 95 is formed with a spout portion 99, where the central opening 97 is slightly enlarged. The spout portion 99 accommodates bending of the flexible braid 94 in one direction, which may occur when the movable contact assembly 55 is pivoted about the switch shaft 47. The spout portion 99 reduces the tendency of the strands 95 to shear against the end of the lug 96A. The second lug 96B could similarly be formed with a spout portion if the braid 94 tended to flex adjacent the second lug 96B.

With reference to FIGS. 3 and 4, the flexible connector 11 is attached to the movable contact finger 12 by initially placing the connector and the contact finger in a work chamber 100. The work chamber 100 includes a valved aperture 101 that is normally closed. A protected chamber 102 is attached to the work chamber 100 such that the two chambers communicate when the valved aperture 101 is open. The protected chamber 102 houses an energy welding source 104.

The flexible connector 11 is then properly positioned relative to the movable contact finger 12. At the first end 15 of the flexible connector 11, the ends of the strands 95 and one end of the lug 96A define a first end face 106 of the flexible connector. The first end face 106 is positioned flush against the attachment surface 70 of the movable contact finger 12. An outer side 107 of the first lug 96A is positioned against the shoulder 68. As a result of this positioning, the first end 15 of the flexible connector 11 extends perpendicularly from the attachment surface 70. The interface between the first end face 106 and the attachment surface 70 defines a joint, indicated by reference numeral 109 in FIG. 3.

To assure that the first end face 106 lies flat against the attachment surface 70, a notch 110 is cut in the attachment surface 70 adjacent the shoulder 68. This prevents a rounded corner from being formed between the shoulder 68 and the attachment surface 70 due to imprecise machining of the contact finger 12. A rounded corner would disadvantageously prohibit the first end face 106 from lying flat against the attachment surface 70.

The energy welding source 104 is preferably an electron gun (not shown) which produces a dense stream of high-velocity electrons. The electron gun requires a high vacuum environment and thus the protected chamber 102 is held at a high vacuum of approximately $10^{-4}$ to $10^{-5}$ torr or less. The work chamber 100 is evacuated to approximately the same high vacuum as the protected chamber 102. The valved aperture 101 is not opened to connect the work chamber 100 and the protected chamber 102 until the work chamber has been evacuated. This protects the components of the electron gun from oxidation and from short-circuiting through welding vapors. The vacuum environment also reduces electron scattering due to air molecules, and thus conserves the effective beam energy.

Electron guns usually consist of a tungsten or tantalum cathode, a grid or forming electrode, and an anode. Electrons are emitted from the cathode which is heated to about 4600° F. or higher. The electrons are gathered, accelerated to a high velocity, and shaped into a beam by electrical fields between the cathode, the grid, and the anode. The electron beam is collimated and focused by passing through the field of an electromagnetic focusing coil or "magnetic lens." The electron beam can be deflected from its normal path by magnetic deflection coils located after the focusing coil. Electron guns are rated at approximately 30 to 175 kV with a beam current of approximately 20 to 1000 ma. An electron gun found to be suitable for this application is manufactured by Hamiliton Standard. This particular electron gun is rated at 130–140 kV with a beam current of 20 ma, and the feed rate was set at 30 inches per minute.

The electron beam from the energy welding source 104 is focused and projected through the valved aperture 101 toward the portion 114 (FIG. 3) of the joint 109 which is exposed at the connection end 59 of the contact finger 12. The direction of the electron beam is parallel to the joint 109, as illustrated by arrow 112 in FIG. 4. The exposed portion 114 of the joint 109 is thus bombarded with the dense stream of high-velocity electrons. The electron beam is focused to about 0.010 to 0.030 inches in diameter, depending on operator preference, and has a power density of approximately $10^6$ watts per square inch.

The kinetic energy of the electrons is transformed into heat upon impact with the flexible connector 11 and the contact finger 12 adjacent to and along the joint 109. The electron beam penetrates along the joint 109 and into the contact finger 12 to a distance which is a function of the strength of the beam and the rate of movement of the beam. The heat of the electron beam creates a weld zone 113 which represents a coalescence of the wire strands 95, the lug 96A, and the contact finger 12. The weld zone 113 is conically shaped because the beam strength is greatest at the exposed portion 114 of the joint 109 and it diminishes at increased depths.

The electron beam is advanced along the exposed portion 114 of the joint 109 so that each strand 95 of the braid 94 is joined to the contact finger 12. This may be accomplished by changing the direction of the beam or moving the flexible connector 11 and contact finger 12 relative to the beam. The weld zone 113 is thought to be formed by the combination of several simultaneous effects. The electron beam vaporizes the copper and forms a hole. Metal on the leading side of the hole vaporizes and then condenses to form molten metal on the trailing side of the hole. Also, molten metal on the leading side of the hole flows to the trailing side of the hole and continuously fills the hole. As the electron beam advances, the molten metal solidifies to form the weld zone 113. Positioning the flexible connector 11 against the shoulder 68 and directing the beam toward the shoulder prevents the electron beam from creating a hole completely through the flexible connector and the contact finger 12.

An area 115 surrounding the weld zone 113 experiences an increase in temperature, although not to a level sufficient to vaporize or liquefy the material of the flexible connector 11 and the contact finger 12. The increased temperature is caused by the heat generated by the electron beam and the conductivity of the copper materials. This area 115, referred to as the heat affected zone and illustrated within the dashed lines in FIG. 4, is approximately 0.010 inches larger than the diameter of the weld zone 113. Compared with other methods of welding, this heat affected zone 115 is relatively small because the high energy from the electron gun is focused in a concentrated area. The relatively small heat affected zone 115 limits annealing of the flexible connector 11 and the contact finger 12, thereby maintaining the flexibility of the connector 11 and the mechanical strength of the contact finger 12.

Figure 5:
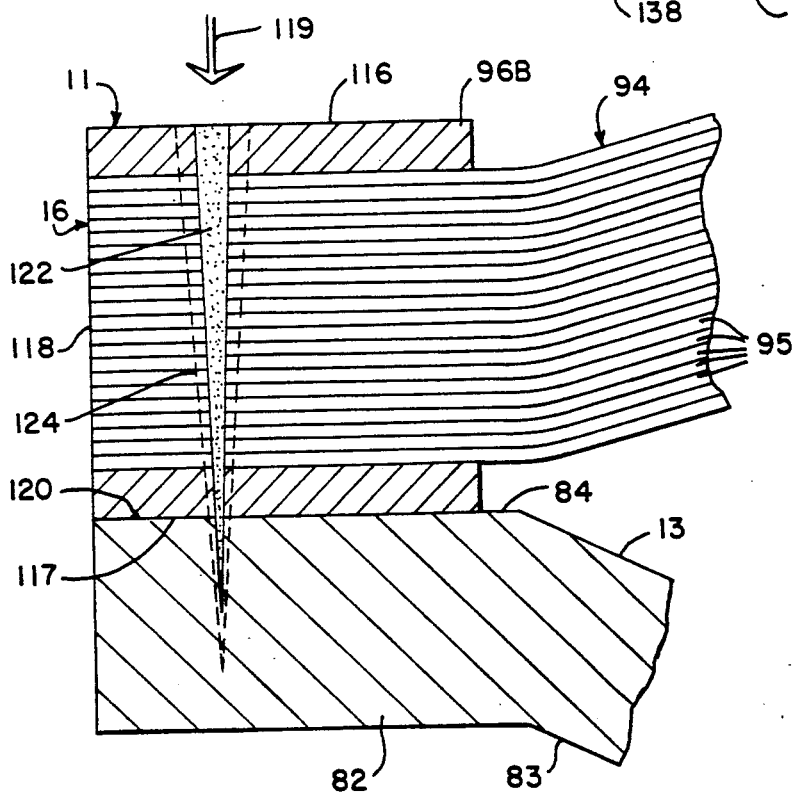
FIG. 5 is an enlarged view in vertical section of a second end of the flexible electrical connector attached to the stationary terminal in accordance with a method of the present invention.
Figure 6:
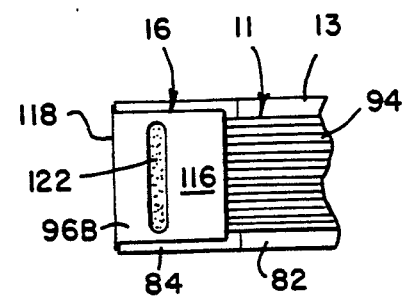
FIG. 6 is top plan view on a reduced scale of the second end of the flexible connector shown in FIG. 5.

The attachment of the second end 16 of the flexible connector 11 to the projection 82 of the stationary terminal 13 is illustrated in FIGS. 5 and 6. The flexible connector 11 and the stationary terminal 13 are placed in the work chamber 100, and the connector is positioned in the following manner relative to the stationary terminal. The second lug 96B includes an outer side 116 and an opposite, identical inner side 117. The inner side 117 is positioned flush against the attachment surface 84. The ends of the strands 95 and an end of the lug 96B define a second end face 118 of the flexible connector 11. The second end face 118 is perpendicular to the plane of the attachment surface 84. Consequently, the second end 16 of the flexible connector 11 is parallel to the attachment surface 84. The interface between the inner side 117 of the second lug 96B and the attachment surface 84 defines a joint 120.

The work chamber 100 is then evacuated to approximately the same high vacuum as the protected chamber 102, and the valved aperture 101 is opened. An electron beam from the energy welding source 104 is focused and projected through the valved aperture 101 toward the outer side 116 of the lug 96B, along a path parallel to the plane of the second end face 118. The direction of the beam, illustrated by arrow 119 in FIG. 5, is thus generally perpendicular to the second end 16 of the flexible connector 11. The beam penetrates radially through the second lug 96B and the strands 95 and intersects the joint 120 at approximately a right angle. The beam can be directed, however, to form other than a 90 degree angle with the plane of the joint 120.

The heat resulting from the electron beam forms a molten column which extends through the braid 94 and the lug 96B and into the stationary terminal 13. The weld zone 122 produced by solidification of the molten column joins the flexible connector 11 and the stationary terminal 13. To properly secure the second end 16 of the flexible connector 11 to the stationary terminal 13, the beam must penetrate partially into the stationary terminal 13, although the beam preferably does not create a hole passing completely through the stationary terminal. As suggested by the shape of the weld zone 122 in FIG. 6, the electron beam is advanced radially along the outer side 116 of the second lug 96B in a direction transverse to the braid 94 so that each strand 95 is directly fused to the stationary terminal 13.

The heat from the electron beam again creates a heat affected zone 124 (FIG. 5) surrounding the weld zone 122 by approximately 0.010 inches. As previously, the heat affected zone 124 is relatively small and limits annealing of the flexible connector 11 and the stationary terminal 13.

The foregoing method of attaching the flexible connector 11 to the movable contact finger 12 and the stationary terminal 13 causes each strand 95 of the braid 94 as well as the lug 96 to be connected directly to both the contact finger and the stationary terminal. The weld zones 113 and 122 incorporate material that was formerly part of the strands 95, the lugs 96A and 96B, and the base materials 12 and 13.

Another significant feature of the foregoing method is that the first end 15 of the flexible connector 11 is positioned to extend perpendicular from the attachment surface 70, and the weld zone 113 is formed with the attachment surface 70 and the first end face 106 of the connector. It is important to note that the perpendicular orientation is achieved without having to mount the flexible connector 11 in any specially-formed hole in the contact finger 12. The second end 16 could likewise have been attached in a perpendicular manner, provided the projection 82 were formed with a shoulder toward which the electron beam could be directed, or the beam could otherwise be directed or controlled so as not to pass completely through the stationary terminal 13.

The perpendicular orientation of the flexible connector 11 has several advantages. As shown FIG. 2, the flexible connector 11 is attached to the movable contact finger 12 in a perpendicular orientation and is attached to the projection 82 of the stationary terminal 13 in a parallel orientation. The contact finger 12 and the stationary terminal 13 can be mounted within the electrical device to advantageously cause the connector 11 to bend in the middle rather than at its ends. The life expectancy of the flexible connector 11 is thereby improved because the braid 94 is subject to less rubbing and shearing against the lugs 96A and 96B.

Additionally, the perpendicular orientation allows the contact finger 12 and the stationary terminal 13 to be positioned relatively close together without causing the braid 94 to bend adjacent the lugs 96A and 96B. Where two parallel orientations are employed, the base materials 12 and 13 must sometimes be located a relatively far apart in order to achieve proper bending of the braid. The perpendicular orientation also allows the flexible connector 11 to be attached to the contact finger 12 at a position that is closer to the pivot point of movable contact assembly 55. Further, the use of only parallel orientations limit how the movable contact finger 12 may be positioned relative to the stationary terminal 13.

Figure 7:
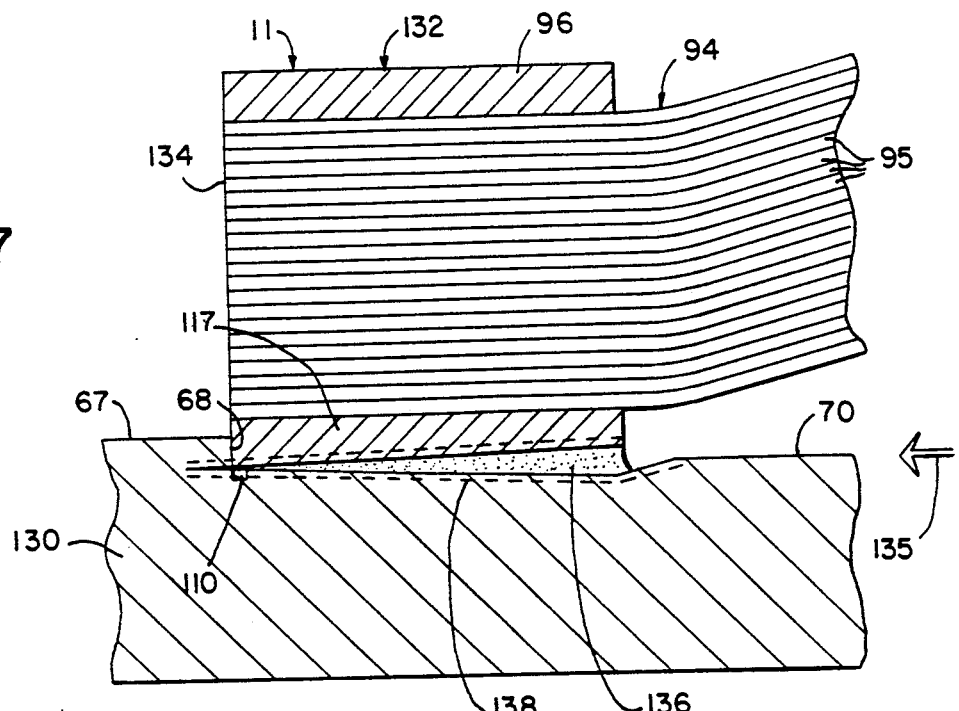
FIG. 7 is an enlarged view in vertical section illustrating another embodiment of the invention.

An alternate method of attachment is illustrated in FIG. 7, where components similar to those previously described have the same reference numeral. In this embodiment, a base material 130 is formed with a main portion 67 which is separated from an attachment surface 70 by a shoulder 68. The width of the base material 130 is greater through the main portion 67 than through the attachment surface 70. A notch 110 is cut into the attachment surface 70 adjacent the shoulder 68 to assure that the shoulder does not curve toward the attachment surface.

An end 132 of the flexible connector 11 includes a lug 96 having an inner side 117. The ends of the strands 95 and an end of the lug 96 define an end face 134 of the flexible connector 11. The flexible connector 11 is positioned so that the inner side 117 lies flush against the attachment surface 70, with a portion of an end of the lug 96 abutting the shoulder 68. A joint is formed between the inner side 117 and the attachment surface 70. As a result, the end face 134 of the flexible connector 11 is perpendicular to the attachment surface 70, and the end 132 of the connector is generally parallel to the attachment surface 70 and the base material 130.

An output beam from the energy welding source 104 (FIG. 4) is focused and directed through the valved aperture 101 toward the exposed portion of the joint. The beam is directed toward the shoulder 68 parallel to the joint, as indicated by arrow 135. Contact between the output beam and the lug 96 and base material 130 produces heat which fuses the lug of the flexible connector 11 to the base material 130, forming a weld zone 136. The output beam also produces a relatively small heat affected zone 138 surrounding the weld zone 136. In this embodiment, the lug 96 and the base material 130 are welded together without directly welding the braid 94. The output beam is advanced along the exposed portion of the joint to weld one entire side 117 of the lug 96 to the base material 130. In this embodiment, the strands 95 of the braid 94 do not form any part of the weld zone 136.

As an alternative to employing an electron gun, the energy welding source 104 can be a laser (not shown). A laser fusion welds the flexible connector 11 to the base material when the laser beam is directed toward the joint and advanced along the joint. The laser, like the electron gun, produces a relatively small heat affected zone. A laser is beneficial because it does not require the evacuated work chamber 100 and the protected chamber 102. The electron gun is preferred to the laser at this time, however, because the penetration of the laser is hindered somewhat due to the reflectivity of the copper connector 11 and the copper base materials 12 and 13.

The disclosed methods have many advantages over prior art methods of attaching flexible connectors 11 to movable contact fingers 12 and stationary terminals 13.

When utilizing an electron gun, the method provides control over the weld dimensions and properties and permits deep, narrow welds with a relatively low heat input. Where numerous parts may be positioned in the evacuated work chamber 100, or where the work chamber is small enough to permit rapid pump down, the method results in high production levels. Also, the working distance of the electron beam may be varied from several inches to several feet, thus permitting welds in otherwise inaccessible locations.

The method also minimizes distortion and shrinkage of the welding components and allows welding of hardened or work-strengthened materials generally without significant deterioration in the mechanical properties along the weld joint. Conveniently, the method may be used on parts that have previously been finished to final assembly dimenions, or used in close proximity to heat-sensitive components or attachments. The method disclosed is capable of welding dissimilar metals not generally joinable by arc welding.

The description has illustrated both parallel and perpendicular orientations of the ends of the flexible connector 11 relative to the attachment surfaces 70 and 84. It has also shown that the output beam of the energy welding source 104 can be directed parallel to the joint or at an angle relative to the joint. Thus, many variations are possible for attaching an end of the flexible connector 11 to one of the base materials 12 or 13.

The foregoing detailed description has been for the purpose of illustration. Thus, a number of modifications and changes may be made without departing from the spirit and scope of the present invention. For example, the flexible connector 11 was shown as a braid 94 with lugs 96 at the ends of the braid, but the connector could take other forms, such as multiple braids or simply a copper wire. Therefore, the invention should not be limited by the specific embodiments described, but only by the claims.

I claim:

1. A method for attaching a flexible electrical connector between a movable contact finger and a stationary terminal, comprising the steps of:
   positioning a first end of the flexible connector in contact with an attachment surface of the movable contact finger, the contact between the flexible connector and the movable contact finger forming a first joint;
   positioning an opposite second end of the flexible connector in contact with an attachment surface of the stationary terminal, the contact between the flexible connector and the stationary terminal forming a second joint;
   directing an electron beam from an electron gun toward the first joint, the electron beam forming a first weld zone that fuses the first end of the flexible connector to the movable contact finger; and
   directing an electron beam from the electron gun toward the second joint, the electron beam forming a second weld zone that fuses the second end of the flexible connector to the stationary terminal.

2. The method as recited in claim 1, further comprising the steps of:
   placing the flexible connector, the movable contact finger and the stationary terminal in a work chamber, the work chamber having a valved aperture that selectively opens the work chamber to a protected chamber housing the electron gun;
   evacuating the work chamber; and
   opening the valved aperture.

3. The method as recited in claim 1, wherein the flexible connector includes:
   a flexible braid having first and second ends corresponding to the first and second ends of the flexible connector;
   a first lug attached to the flexible braid toward the first end; and
   a second lug attached to the flexible braid toward the second end.

4. The method as recited in claim 3, wherein:
   the first end of the braid and an end of the first lug define a first end face on the flexible connector; and
   the first end face is positioned flush against the attachment surface of the movable contact finger so that the first end of the flexible braid is perpendicular to the attachment surface of the movable contact finger.

5. The method as recited in claim 4, wherein the first weld zone is formed with the first end face of the flexible connector and the attachment surface of the movable contact finger.

6. The method as recited in claim 4, wherein:
   a shoulder is formed in the movable contact finger adjacent the attachment surface; and
   the first lug abuts the shoulder.

7. The method as recited in claim 4, wherein:
   the second end of the braid and an end of the second lug define a second end face of the flexible connector; and
   a side of the second lug is positioned flush against the attachment surface of the stationary terminal so that the second end face is perpendicular to the attachment surface of the stationary terminal and the second end of the flexible braid is parallel to the attachment surface of the stationary terminal.

8. The method as recited in claim 3, wherein;
   the first end of the braid and an end of the first lug define a first end face of the flexible connector; and
   a side of the first lug is positioned flush against the attachment surface of the movable contact finger so that the first end face of the flexible braid is perpendicular to the attachment surface of the movable contact finger and the first end of the flexible connector is parallel to the attachment surface of the contact finger.

9. The method as recited in claim 8, wherein:
   the electron beam directed toward the first joint is directed parallel to the attachment surface of the movable contact finger; and
   the first weld zone is formed with the side of the first lug and the attachment surface of the movable contact finger.

10. The method as recited in claim 8, wherein:
    the electron beam directed toward the first joint is directed perpendicular to the attachment surface of the movable contact finger; and
    the first weld zone is formed with the first lug, the first end of the flexible braid, and the attachment surface of the movable contact finger.

11. A method for attaching a flexible electrical connector between a movable contact finger and a stationary terminal, comprising the steps of:
    positioning a first end of the flexible connector in contact with an attachment surface of the movable contact finger, the contact between the flexible connector and the movable contact finger forming a first joint;

positioning an opposite second end of the flexible connector in contact with an attachment surface of the stationary terminal, the contact between the flexible connector and the stationary terminal forming a second joint;

directing an output beam from a laser toward the first joint, the output beam forming a first weld zone that fuses the first end of the flexible connector to the movable contact finger; and directing an output beam from the laser toward the second joint, the output beam forming a second weld zone that fuses the second end of the flexible connector to the stationary terminal.

12. The method as recited in claim 11, wherein the flexible connector includes:

a flexible braid having first and second ends corresponding to the first and second ends of the flexible connector;

a first lug attached to the flexible braid toward the first end; and a second lug attached to the flexible braid toward the second end.

13. The method as recited in claim 12, wherein:

the first end of the braid and an end of the first lug define a first end face of the flexible connector; and the first end face is positioned flush against the attachment surface of the movable contact finger so that the first end of the flexible braid is perpendicular to the attachment surface of the movable contact finger.

14. A method for attaching a flexible electrical connector to a base material, comprising the steps of:

positioning an end face of the flexible connector flush against an attachment surface of the base material so that the flexible connector extends generally perpendicular from the attachment surface, the contact between the flexible connector and the base material forming a joint;

directing an output beam from an energy welding source toward the joint, the output beam forming a weld zone that fuses the end face of the flexible connector to the base material.

15. The method as recited in claim 14, wherein the energy welding source is an electron gun.

16. The method as recited in claim 14, wherein the energy welding source is a laser.

17. A method for attaching a flexible electrical connector to a base material, wherein the flexible connector has a first end and includes a lug attached toward the first end, and the base material includes a main surface that is separated from an attachment surface by a shoulder; the method comprising the steps of:

placing the flexible connector and the base material in a work chamber, the work chamber having a valved aperture that selectively opens the work chamber to a protected chamber housing an electron gun;

positioning the lug of the flexible connector in contact with the attachment surface and abutting the shoulder of the base material so that a first end face of the flexible connector is perpendicular to the attachment surface and the first end of the flexible connector is parallel to the attachment surface, the contact between the flexible connector and the base material forming a joint;

evacuating the work chamber;

opening the valved aperture; and directing an output beam from the electron gun toward the joint, the electron beam forming a weld zone that fuses the first end of the flexible connector to the base material.

18. The method as recited in claim 17, wherein the electron beam is directed parallel to the attachment surface of the base material.

19. The method as recited in claim 17, wherein the electron beam is directed to intersect the joint at an angle.

* * * * *